United States Patent [19]
Ridder et al.

[11] Patent Number: 5,898,750
[45] Date of Patent: Apr. 27, 1999

[54] NESTED SLEEVE GRID RESTRAINT SYSTEM

[75] Inventors: Richard Lee Ridder; William Eastham Bailey, both of Lynchburg, Va.

[73] Assignee: Framatome Technologies, Lynchburg, Va.

[21] Appl. No.: 09/012,492

[22] Filed: Jan. 23, 1998

[51] Int. Cl.[6] .................................................. G21C 3/34
[52] U.S. Cl. ........................ 376/441; 376/442; 376/438
[58] Field of Search .................................. 376/438, 441, 376/442, 446, 261, 353

[56] References Cited

U.S. PATENT DOCUMENTS

| | | | |
|---|---|---|---|
| 4,294,660 | 10/1981 | Christiansen | 376/442 |
| 4,678,630 | 7/1987 | King et al. | 376/438 |

Primary Examiner—Charles T. Jordan
Assistant Examiner—Matthew J. Lattig
Attorney, Agent, or Firm—Pollock, Vande Sande & Amernick

[57] ABSTRACT

A nested sleeve grid restraint system and a method for making a nested sleeve grid restraint system are disclosed. The nested sleeve grid restraint system comprises an insert tube installed in and secured to the intermediate spacer grid and concentrically around a fuel assembly instrumentation tube, the insert tube having ends extending from the intermediate spacer grid, respectively, above and below the intermediate spacer grid; two spacer sleeves, each having flared ends; the spacer sleeves each being fitted concentrically around the fuel assembly instrumentation tube, respectively, above and below the intermediate spacer grid; the flared ends of the spacer sleeves fitting over the ends of the insert tube extending above and below the intermediate space grid whereby the insert tube nests in the spacer sleeves.

14 Claims, 3 Drawing Sheets

NESTED SLEEVE GRID RESTRAINT SYSTEM

BACKGROUND OF THE INVENTION

This invention relates to the positioning of spacer grids for nuclear fuel assemblies.

Typically, fuel assemblies comprise long cylindrical fuel rods, supported together in a bundle arrangement, and spacer grids, located at regular intervals along the length of the fuel rods. The fuel rods are spaced in an array which includes guide tubes for control rods and an instrumentation guide tube. The control rod guide tubes are open at their upper ends to allow control rods into the fuel assembly for the purposes of regulating the nuclear reaction. The instrumentation guide tube is open at its lower end to allow an instrumentation probe to be inserted into the fuel assembly to monitor the operating conditions of the fuel assembly.

Intermediate spacer grids (ISG) are generally comprised of slotted rectangular grid strips arranged to intersect in an egg crate manner forming cells through which the guide tubes and fuel rods are inserted. The spacer grids support the fuel assembly and maintain lateral spacing between the guide tubes and fuel rods. Spacer grid assemblies must maintain precise spacing between fuel rods in order to insure mechanical and thermal stability during operation of the fuel assembly. It is thus very important that spacer grids remain fixed during operation of the fuel assembly. For a discussion of the problems associated with improperly spaced fuel rods, see U.S. Pat. No. 4,294,660, which is incorporated herein by reference.

A number of means are used to prevent movement of intermediate spacer grids. One method for restraining an intermediate spacer grid from axial movement in a nuclear fuel assembly is shown in FIG. 1 and consists of a column of spacer sleeves 8 and inserts 9 placed concentric to the instrumentation tube in the center of the fuel assembly. The inserts are installed in the center cells of each intermediate spacer grid, and consist of a short length of tubing with a welded collar 10 at one end. The welded collar interfaces with the grid strips and prevents the intermediate spacer grid 11 from moving upward. The spacer sleeve below each intermediate spacer grid interfaces with the intermediate spacer grid to prevent it from moving downward.

The above discussed spacer sleeve to intermediate spacer grid interface below each grid is considerably weaker than the upward interface, thus potentially allowing the intermediate spacer grid to slide downwards if it becomes caught during routine fuel handling. Inspection for and repair of irradiated spacer grids that are displaced in such a manner tends to be very tedious and expensive.

Another example of a related prior art spacer grid retaining system is disclosed in U.S. Pat. No. 4,678,630.

Additional problems associated with prior art spacer grid systems include misalignment of the spacer grid restraint systems and spacer grids during installation which can lead to instability in the fuel assembly structure; bulky or complex restraint configurations which lead to increased pressure drop through the fuel assembly and unnecessary structural volume in the active fuel region; expense and time associated with fabricating and installing restraint systems which use welded connections to prevent longitudinal movement of intermediate spacer grids, as well as problems and costs associated with the failure of welds in these systems.

SUMMARY OF INVENTION

It is an object of the invention to provide a grid restraint system having restraining interfaces above and below each intermediate spacer grid to prevent spacer grid slippage under all conditions.

It is a further object of the invention to provide an interface having a configuration which minimizes pressure drop impact through the fuel assembly and which minimizes the necessary structural volume in the active fuel region of the fuel assembly.

It is a still further object of the invention to provide a restraint system which effectively restrains intermediate spacer grids from upward and downward movement without the use of a welded connection.

It is a still further object of the invention to provide a restraint system which is self-aligning, so that all spacer sleeves and tube inserts are coaxially aligned prior to installation of the instrumentation tube.

It is a still further object of the invention to provide a restraint system in which compressive loads of the fuel assembly are transmitted from spacer sleeves to intermediate spacer grids through flared ends of a spacer sleeve resting against a grid strip of an intermediate spacer grid.

It is a still further object of the invention to provide a restraint system in which compressive loads of the fuel assembly are transmitted from spacer sleeves to intermediate spacer grids through a transition zone at the flared ends of a spacer sleeve in contact with ends of an insert tube.

In accordance with the objects of the invention, a nested sleeve grid restraint system is provided comprising an insert tube installed in and secured to the intermediate spacer grid and concentrically around a fuel assembly instrumentation tube, the insert tube having ends extending from the intermediate spacer grid, respectively, above and below the intermediate spacer grid; and two spacer sleeves, each having flared ends. The spacer sleeves are each fitted concentrically around the fuel assembly instrumentation tube, respectively, above and below the intermediate spacer grid. The flared ends of the spacer sleeves fit over the ends of the insert tube extending above and below the intermediate space grid so that the insert tube nests in the spacer sleeves.

In a further aspect of the invention, the spacer sleeves have transition zones to the flared ends of the spacer sleeves so as to provide a bearing surface for the insert tube.

In another aspect of the invention, the flared ends of the spacer sleeve rest against grid strips on the intermediate spacer grid.

In an additional aspect of the invention, the outside diameters of the flared ends of the spacer sleeves are equal to the outside diameters of the grid strips against which the spacer sleeves rest.

DETAILED DESCRIPTION OF THE PREFERRED EMBODIMENTS

Figure 1:
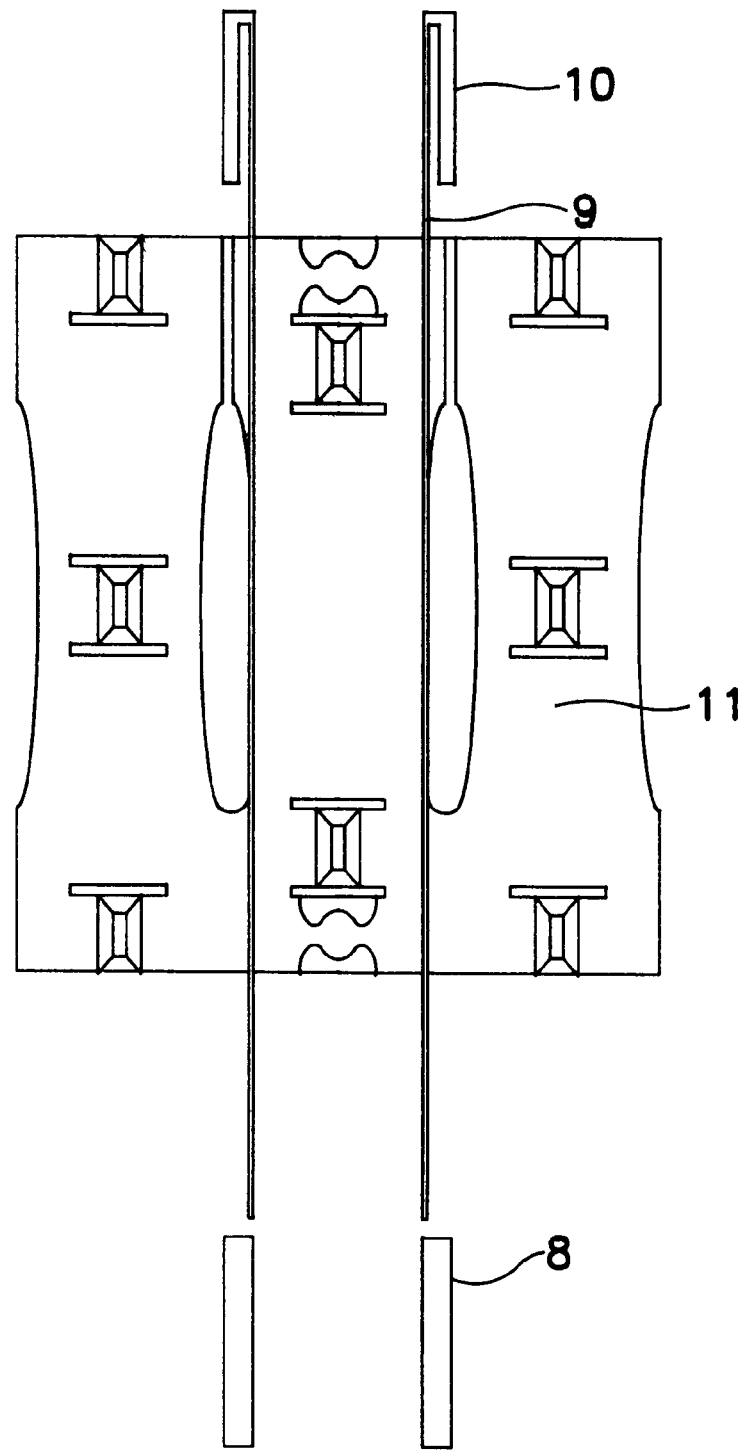
FIG. 1 shows a prior art restraining system for restraining intermediate spacer grids from axial movement on a nuclear fuel assembly.

Preferred embodiments of the invention will now be explained with reference to the drawing figures.

Figure 2:
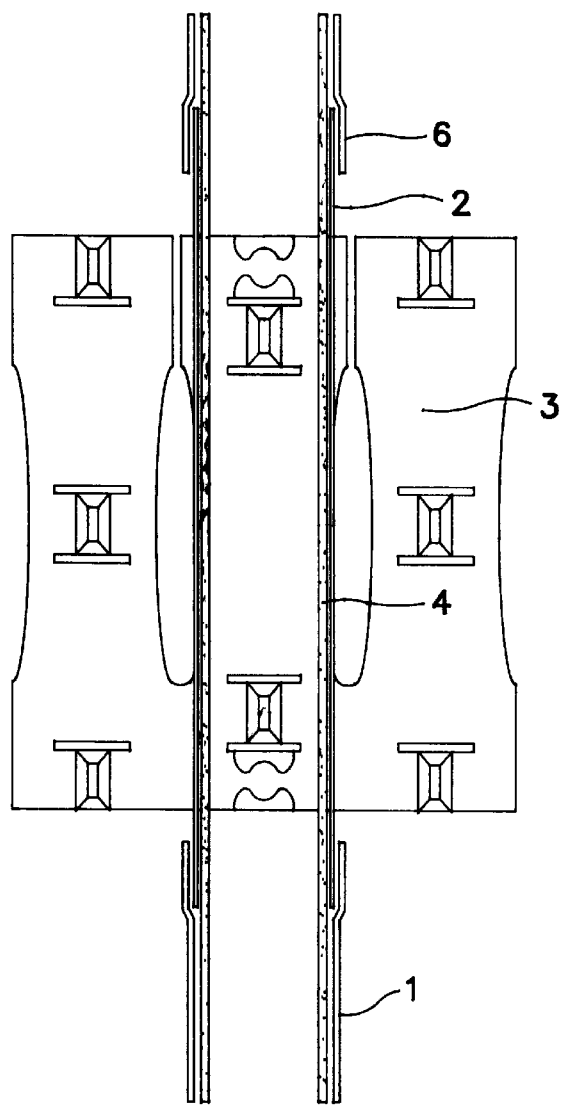
FIG. 2 shows a sectional view of the nested sleeve grid restraint system of the invention.

FIG. 2 shows a preferred arrangement of the proposed invention. The spacer sleeve 1 is positioned concentrically about a central instrumentation tube 4 above and below an intermediate spacer grid 3. The spacer sleeve preferably consists of a Zircaloy-4 tube approximately 18 inches long, with both ends swaged, or flared open forming flares 6 of a length of approximately 3/16 of an inch.

An insert tube 2, preferably comprising a piece of tubing approximately three inches in length, is installed around the central instrumentation tube 4 of each intermediate spacer grid 3. Both ends of the insert tube protrude from the intermediate spacer grid 3 and "nest" inside the flared ends of the spacer sleeves 1 above and below the intermediate spacer grid 3. The flared ends of the spacer sleeves 1 rest against grid strips 7 on each intermediate spacer grid 3 to form a solid interface both above and below the intermediate spacer grid 3 (see FIG. 3). The instrumentation tube 4 passes inside the spacer sleeve 1, insert tube 2 and intermediate spacer grid 3.

Figure 3:
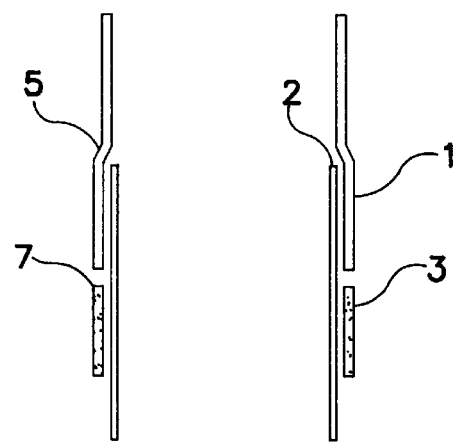
FIG. 3 shows a sectional view of the spacer sleeve, insert tube and intermediate spacer grid.

The flared ends of the spacer sleeves are preferably produced by a cold-forming (punch and die) process. The punch and die includes stepped diameters, in order to form a sharp transition zone 5, shown in FIG. 3, between the original tubing and the flare (6). The inside of the transition zone 5 is sufficiently abrupt so as to provide a bearing surface for the insert tube 2, as shown in FIG. 3.

During operation, insert tubes and spacer sleeves are placed in compression due to the accumulated hydraulic lift loads from intermediate spacer grids in the fuel assembly. These compressive loads are preferably transmitted from sleeve to tube at least partially through the transition zone 5. Additionally, it is preferred that the geometry of the flare is such that its outer diameter matches that of the grid strip 7 against which it bears. See FIG. 3. Thus, the ends of the flare 6 of the spacer sleeve 1, as well as the transition zone 5, can be load bearing surfaces.

Figure 4:
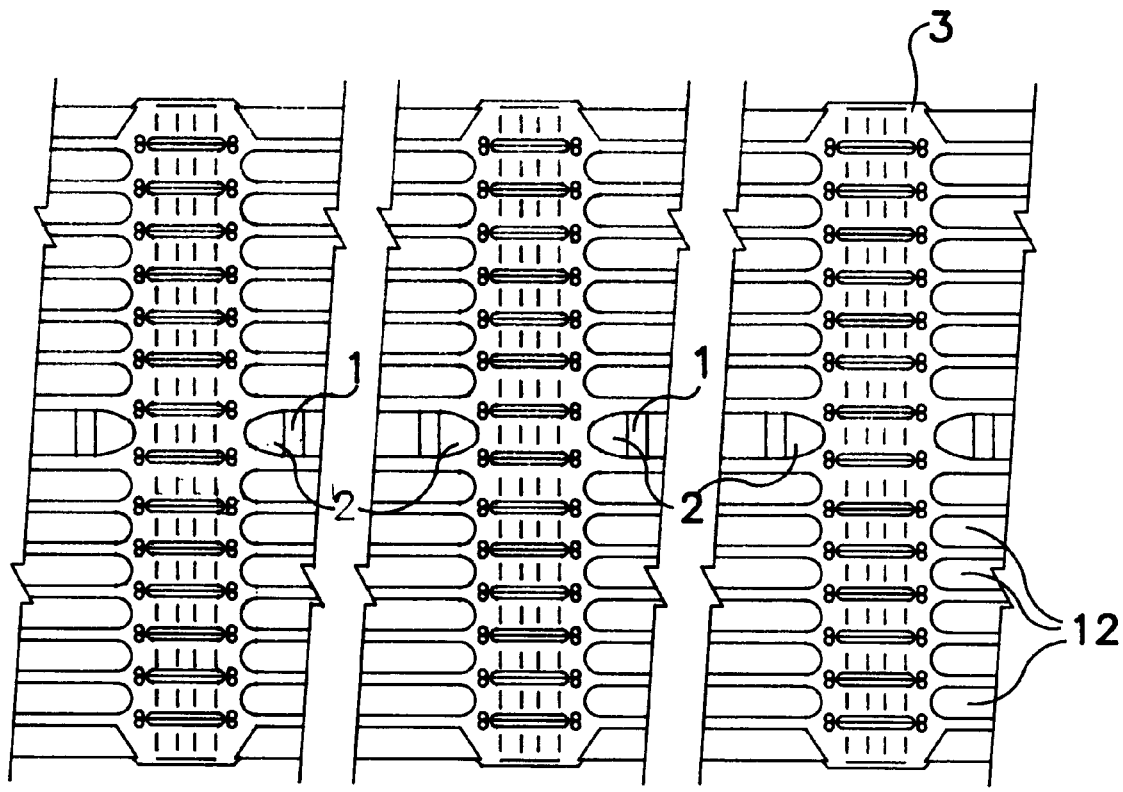
FIG. 4 shows a side view of a fuel assembly in which the invention is used.

In a preferred method of installing spacer sleeves, an insert tube 2 is placed inside each intermediate spacer grid 3. Spacer sleeves 1 are then placed in the spans between the grids, and their flares 6 are slid over the ends of the insert tubes 2 protruding from the intermediate spacer grid 3. In this manner, the column of sleeves is self-supporting and is already axially aligned. The instrumentation tube 4 is then installed through all the sleeves and inserts from the top of the fuel assembly. FIG. 4 shows a side view of the fuel assembly comprising fuel rods 12, insert tubes 2, spacer sleeves 1 and spacer grids 3 after fabrication is completed.

We claim:

1. A nested sleeve grid restraint system for restraining movement of an intermediate spacer grid in nuclear fuel assemblies, said nested sleeve restraint system comprising:

(a) an insert tube, secured in said intermediate spacer grid and installed concentrically about a fuel assembly instrumentation tube extending through said intermediate spacer grid, said insert tube having ends extending from said intermediate spacer grid, respectively, above and below said intermediate spacer grid;

(b) a first and a second spacer sleeve, each having flared ends;

(c) said first and second spacer sleeves each being fitted concentrically around said fuel assembly instrumentation tube, respectively, above and below said intermediate spacer grid;

(d) said flared ends of said spacer sleeves fitting over the ends of the insert tube extending above and below said intermediate spacer grid, whereby said insert tube nests in said spacer sleeves.

2. The nested sleeve grid restraint system according to claim 1, wherein said spacer sleeves are approximately 18 inches long.

3. The nested sleeve grid restraint system according to claim 1, wherein said flared ends of said spacer sleeves are approximately 3/16 in length.

4. The nested sleeve grid restraint system according to claim 1, wherein said insert tube is approximately three inches long.

5. The nested sleeve grid restraint system according to claim 1, wherein said flared ends of each of said spacer sleeves rest against grid strips on said intermediate spacer grid.

6. The nested sleeve grid restraint system according to claim 5, wherein an outside diameter of said flared ends of said spacer sleeves have an outside diameter equal to an outside diameter of said grid strips.

7. The nested sleeve grid restraint system according to claim 1, further comprising a transition zone to said flared ends of said spacer sleeves, said transition zone being sufficiently abrupt to provide a bearing surface for said insert tube.

8. The nested sleeve grid restraint system according to claim 1, wherein said spacer sleeves are self-coaxially aligned.

9. A method of making a nested sleeve grid restraint system for restraining movement of an intermediate spacer grid in nuclear fuel assemblies, said method comprising the steps of:

(a) forming two flared end spacer sleeves by using a punch-and-die process to create transition zones between an original portion of each of said spacer sleeves and flared ends of each of said spacer sleeves;

(b) installing an insert tube inside an intermediate spacer grid at an instrumentation tube cell;

(c) placing said flared ends of each of said spacer sleeves over ends of said insert tube extending from said intermediate spacer grid;

(d) installing an instrumentation tube through the insert tube and spacer sleeves.

10. The method of making a nested sleeve grid restraint system according to claim 9, further comprising the step of sizing said spacer sleeves to be approximately 18 inches.

11. The method of making a nested sleeve grid restraint system according to claim 9, further comprising the step of sizing said flared ends to be approximately 3/16 of an inch long during said step of forming two flared end spacer sleeves.

12. The method of making a nested sleeve grid restraint system according to claim 9, further comprising the step of sizing said insert tube to be approximately 3 inches long.

13. The method of making a nested sleeve grid restraint system according to claim 9, further comprising the step of resting said flared ends of said spacer sleeve against grid strips on said intermediate spacer grid while placing said flared end spacer sleeves over ends of said insert tube.

14. The method of making a nested sleeve grid restraint system according to claim 9, further comprising the step of resting inner surfaces of said transition zones of said spacer sleeves on ends of said insert tube.

* * * * *